United States Patent Office 2,713,162
Patented July 12, 1955

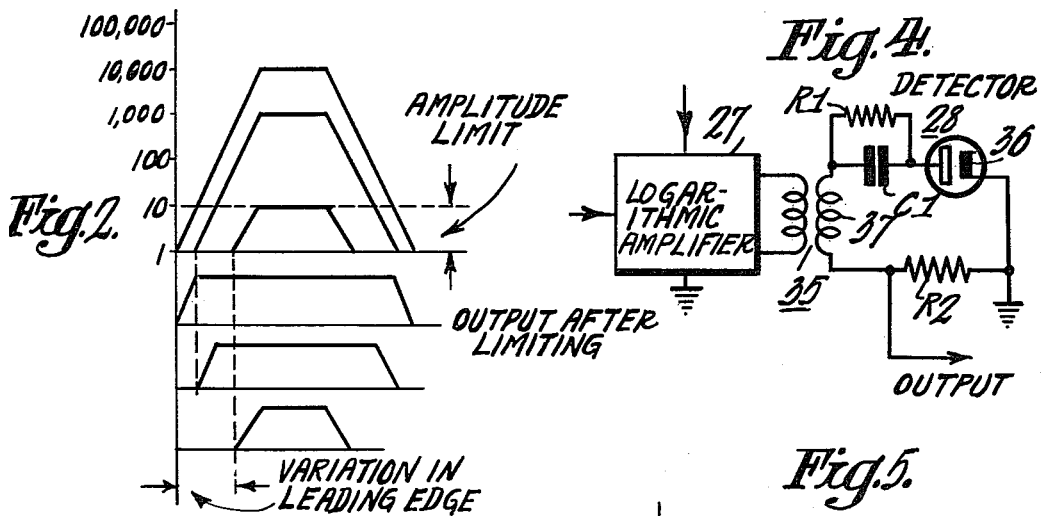
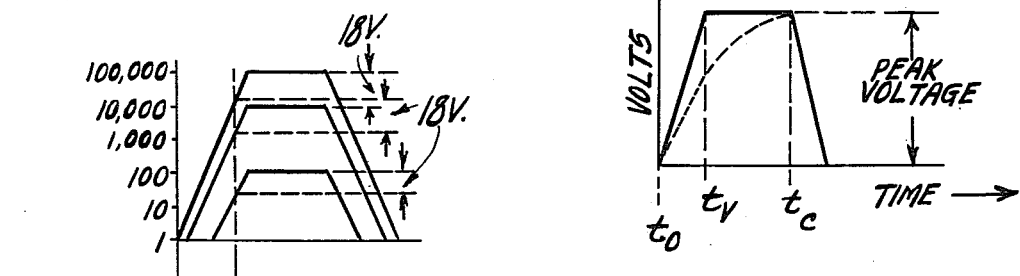
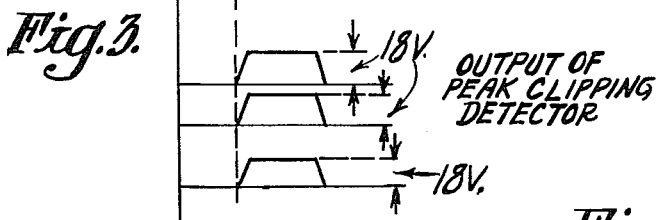
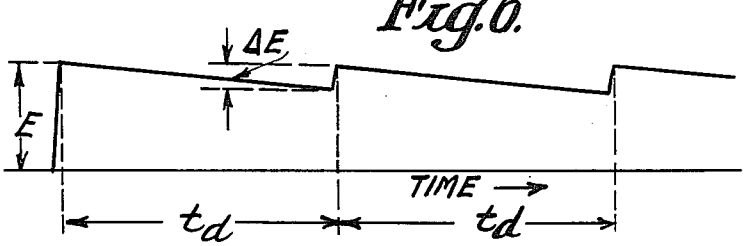
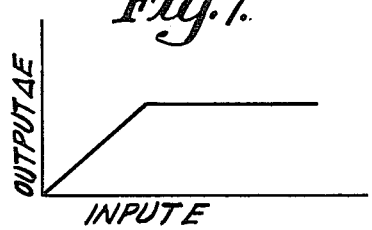
INVENTOR
John B. Gehman
BY J. L. Whittaker
ATTORNEY

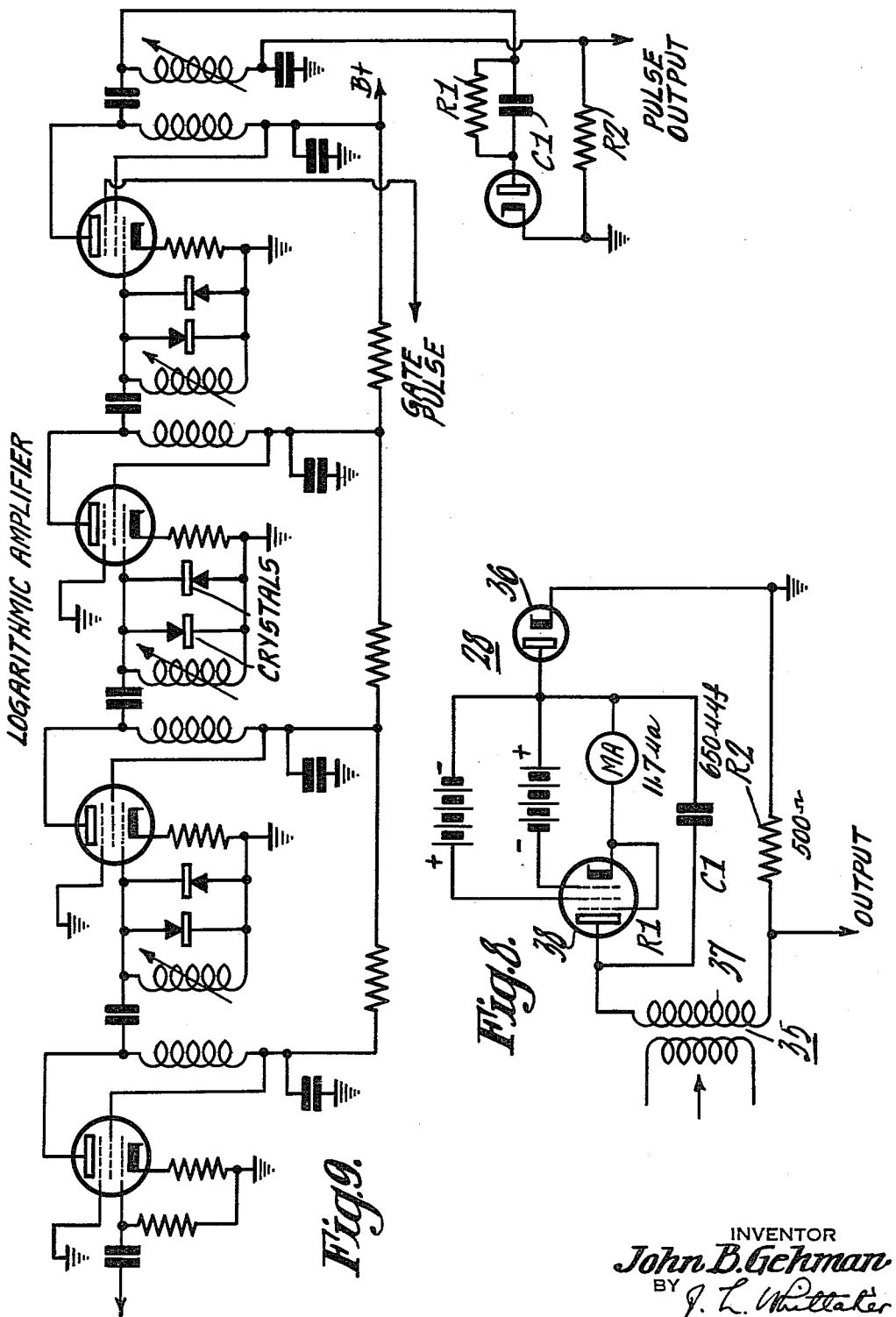

2,713,162

PULSE RECEIVER WITH LOGARITHMIC AMPLIFIER AND BASE CLIPPING DETECTOR

John B. Gehman, Haddonfield, N. J., assignor to Radio Corporation of America, a corporation of Delaware Application December 14, 1950, Serial No. 200,761

5 Claims. (Cl. 343—103)

My invention relates to pulse receivers and particularly to Shoran receivers or the like where the timing of the front edges of the output pulses should not be affected by variations in the amplitude of the received pulses.

The reason that such output pulses have variations in front edge timing with variations in the amplitude of the received pulses is that the larger amplitude pulses are limited or clipped at some point in the receiver when usual design practice is followed.

An object of the invention is to provide an improved method of and means for converting small voltage pulses of widely varying amplitude into amplified pulses of constant amplitude having front edges that do not vary in timing with said variations in amplitude.

A further object of the present invention is to provide an improved pulse receiver for providing output pulses that have front edges which remain substantially constant in timing regardless of variations in the amplitude of the received pulses.

A still further object of the invention is to provide a pulse receiver that is designed to pass only the top portions of the received pulses so that the timing of the front edges of the pulses will not change with changes in the amplitude of the received pulses.

A still further object of the invention is to provide an improved base clipping detector.

A still further object of the invention is to provide an improved amplifier and detector combination for providing pulses of constant front edge timing regardless of variations in the amplitude of the pulses being supplied to the input circuit of said amplifier.

According to a preferred embodiment of the invention the received pulses are passed through a logarithmic amplifier to compress the amplitude variations. The amplifier output is applied to a base clipping detector that is designed to pass only the peaks of the pulses. More specifically, the base clipping detector passes the peaks of pulses that are clipped a certain number of volts down from the top of the pulse. As a result, the detector output pulses have constant amplitude and have front edges of substantially constant timing even though the received pulses may vary greatly in amplitude.

The invention will be better understood from the following description taken in connection with the accompanying drawing in which:

Fig. 2 is a group of graphs illustrating the results of undesired pulse limiting in a pulse receiver;

Fig. 3 is a group of graphs illustrating the results obtained by practicing the present invention;

Fig. 4 is a block and circuit diagram of one embodiment of the present invention;

Figs. 5, 6 and 7 are graphs that are referred to in explaining the invention;

Fig. 8 is a circuit diagram illustrating one embodiment of a base clipping detector designed in accordance with the present invention; and Fig. 9 is a circuit diagram of one embodiment of the invention, showing a suitable logarithmic amplifier that may be employed in practicing the invention.

In the several figures similar parts are indicated by similar reference characters.

Figure 1:
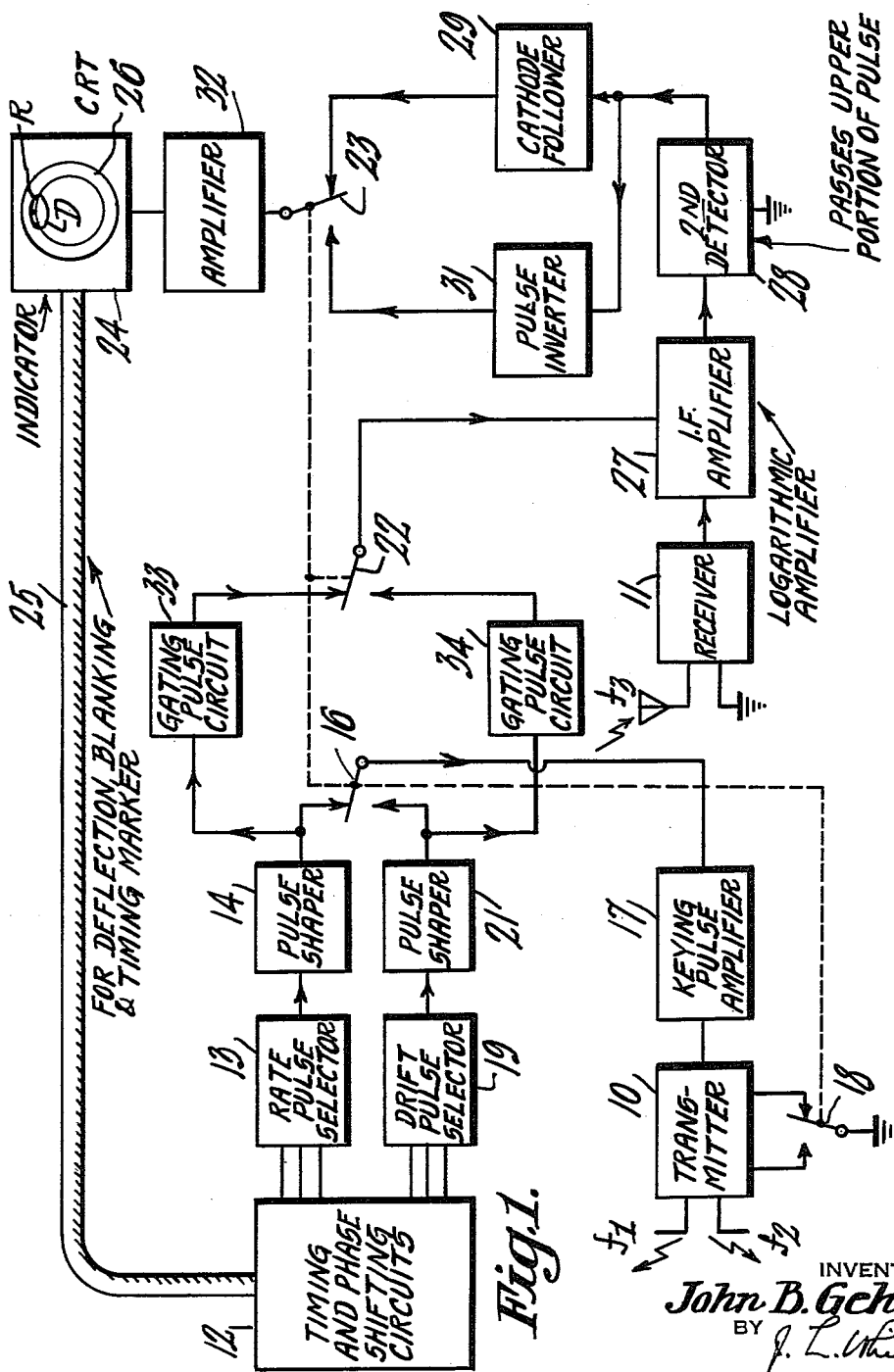
Fig. 1 is a block diagram of a Shoran system employing the present invention.

The present invention is applicable to various types of apparatus and particularly to any equipment utilizing the front edge of a pulse to make a time measurement. However, the invention will be described, by way of example, as applied to Shoran equipment. Shoran systems are well known in the art. Reference is made to Seeley Patent 2,526,287 issued October 17, 1950, showing one particular Shoran system.

Fig. 1 is a simplified block diagram of the system described in the said Seeley Patent 2,526,287 but with the intermediate frequency amplifier and the second detector designed in accordance with the present invention.

The apparatus of Fig. 1 is designed to be carried by an aircraft, for example, to determine the position of the aircraft with respect to two ground repeater stations. A pulse transmitter 10 transmits alternately at carrier frequencies $f1$ and $f2$. One ground repeater station receives the pulses on frequency $f1$ and retransmits them at a carrier frequency $f3$ to a receiver 11. The other ground repeater station receives the pulses on frequency $f3$ and retransmits them at the carrier frequency $f3$ to the receiver 11.

The pulses for modulating the transmitter 10 are produced by a circuit comprising timing and phase shifting circuits represented by the block 12. The apparatus of block 12 may include a crystal oscillator, frequency dividers and geared goniometer type phase shifters as described in the above-mentioned Seeley patent.

One set of geared phase shifters (included in block 12) supply signals to a rate pulse selector 13 to provide rate pulses having a certain phase with respect to the reference time. These rate pulses are passed through a pulse shaper 14 and through a switch arm 16 (when in the upper position) to a keying pulse amplifier 17. The amplified rate pulses modulate transmitter 10 while it is switched by a switch arm 18 to operate at carrier frequency $f1$.

Similarly, another set of geared phase shifters (included in block 12) supply signals to a drift pulse selector 19 to provide drift pulses of the same repetition rate as and similar to the rate pulses but having a different selected phase with respect to the reference time. The drift pulses are passed through a pulse shaper 21 and through the switch arm 16 (when in the down position) to the amplifier 17. The drift pulses modulate or key the transmitter 10 when it is switched to operate on carrier frequency $f2$.

The switch arms 16 and 18, as well as the switch arms 22 and 23 referred to hereinafter, are ganged together.

The time required for the rate and drift pulses to travel to their respective ground repeater stations and back to the receiver 11 is determined by means of an indicator 24 comprising a cathode ray tube 26. The indicator 24 is supplied (by way of a cable 25 from the unit 12) with timing marker signals, deflection signals to produce circular deflection of the cathode ray, and suitable blanking pulses.

The rate and drift pulses retransmitted from the ground repeater stations are received by the receiver 11 which is of the superheterodyne type in the present example. The pulses are amplified in a logarithmic I.-F. amplifier 27 in accordance with the present invention and supplied to a second detector 28 which is designed, as previously stated, to pass the peaks of the pulses.

The second detector output pulses are applied to a cathode follower 29 and to a pulse inverter 31, and are supplied through the switch arm 23 and an amplifier 32 to a radial deflecting electrode in the cathode ray tube 26. The polarity of the pulses applied to tube 26 is reversed each time the position of switch arm 23 is changed so that rate pulses are indicated by an outward pip R on the cathode ray tube screen and drift pulses by an inward pip D.

Gating pulse circuits 33 and 34 are provided to supply gating pulses through the switch 22 to the I.-F. amplifier 27 in order that only the retransmitted pulses from the desired ground repeater stations will be passed on to the second detector 28. One gating circuit provides gating for the rate pulses and the other gating circuit provides gating for the drift pulses. The gating circuits include suitable means for shifting the phase of the gate pulses in accordance with usual practice.

The reason for employing the present invention wherein the second detector passes only the peak portions of the pulses will be apparent from the graphs of Fig. 2. Where the received pulses vary widely in amplitude due to fading or other causes, the result in the usual receiver is that all of the received pulses are amplitude limited at some point in the receiver. Consequently, as shown in Fig. 2, the receiver output pulses will have leading edges that vary in timing because of said limiting action and inaccuracies in time measurements will result.

Fig. 3 illustrates the result of employing the present invention where top portions of the pulses are passed by the second detector 28. It will be noted that the timing of the front edges of the pulses is the same regardless of the amplitude of the received pulse.

It may be noted that the received pulses in the example illustrated have been assumed to have an exponential rise. In actual practice in a Shoran system the pulses do rise exponentially for the greater part of the rise and when they are compressed, the leading edge will appear as a linear rise up to a point close to the pulse peak. Therefore, the illustrations in Figs. 2 and 3 showing the front edges of the pulses with a linear rise are substantially correct.

Fig. 4 shows one suitable form of base clipping detector 28 that may be employed in practicing the present invention. The detector circuit comprises a diode 36, a load resistor R2, an input impedance unit comprising a secondary 37 of a transformer 35, and a capacitor C1 connected in series. The capacitor C1 is shunted by a leak resistor R1 that preferably is a constant current device.

In a system such as Shoran some suitable amplitude compression amplifier such as the logarithmic amplifier 27 is necessary as otherwise the base clipping detector is unable to function because of the wide variations in pulse amplitude. Any suitable amplitude compressing amplifier may be employed but a logarithmic or linear-logarithmic amplifier is preferred.

Before considering in detail the operation and design of the base clipping detector 28, the general mode of operation will be described. A received pulse will appear across the secondary 37 with positive polarity so as to produce a pulse of current through the diode 36 and through the capacitor C1 and resistor R2. The capacitor C1 will be brought close to full charge, to 90 per cent full charge, for example. Between the termination of said charging pulse and the next pulse, the capacitor C1 will discharge a comparatively small amount through the shunting resistor R1.

The occurrence of said next pulse will cause current flow through diode 36 and output resistor R2 as soon as the pulse voltage rises to a value exceeding the voltage remaining across capacitor C1. This current flow through output resistor R2 represents the desired peak portion of the received pulse.

Since variations in the amplitude of the received pulses, due to fading for example, are slow compared with the repetition period of the pulses, the action of detector circuit 28 will readily follow either increases or decreases in pulse amplitude.

Fig. 8 shows, by way of example, one specific design for a suitable base clipping detector 28 that may be used in the circuit of Fig. 1. In this design the resistor R1 is a constant current device comprising a pentode vacuum tube 38 that is adjusted for a constant current of 11.7 micro-amperes over the operating voltage range. The capacitor C1 has a capacity of 650 micromicrofarads and the resistor R2 has a resistance of 500 ohms. It should be understood that any suitable constant current device may be employed in place of the pentode 38.

In order to disclose more fully how a suitable base clipping detector may be designed, the calculations for the circuit of Fig. 8 will now be given with particular reference to the graphs of Figs. 5, 6 and 7.

Assume, for example, that the received pulses have a repetition time of $t_d = 1000$ micro-seconds, a rise time $t_v = 0.25$ micro-second, and a flat top of duration $t_p = 0.5$ micro-second.

The resistance of the output load resistor R2 is determined primarily by the source impedance of the driving circuit through the transformer 35. In this instance a value of 500 ohms is selected for the resistor R2.

The capacity of C1 is determined by the time $t_c$ where $t_c$ is the time required to charge capacitor C1 to 90 per cent, for example, of the peak voltage of the pulses appearing across the secondary winding 37. There is nothing critical about the 90 per cent value assumed, but preferably capacitor C1 should not go to full charge.

To calculate for a 90 per cent charge of C1, let the charge time $t_c$ equal 3 times the pulse rise time $t_v$. Then $$3t_v = t_c$$

Also for 90 per cent charge, $$2.31 R_2 C_1 = t_c$$

where $R_2$ and $C_1$ are the resistance and capacity values of R2 and C1, respectively. Substituting, $$3t_v = 2.31 R_2 C_1$$

or $$C_1 = \frac{3}{2.31}\left(\frac{t_v}{R_2}\right)$$

Then for the values assumed, $$C_1 = \frac{3}{2.31}\left(\frac{0.25 \times 10^{-6}}{500}\right) = 650 \text{ micro-microfarads}$$

The average resistance value of the constant current resistive device R1 may be determined as follows:

$Q =$ the charge on capacitor C1.

The loss in Q following the termination of a pulse is $\Delta Q = i t_d$ where $i$ is the constant current through R1 and $t_d$ is the pulse repetition period.

Since the pulse repetition rate is fixed, it is apparent that $\Delta Q$ is determined by the value of the constant current $i$.

$Q = C_1 E$ where E is the voltage across capacitor C1 and $$\Delta Q = C_1 \Delta E \text{ or } \Delta E \frac{\Delta Q}{C_1}$$

where $\Delta E$ is the loss in voltage across C1 between successive received pulses. See the graph of Fig. 6.

Thus $\Delta E$ is determined by the constant current $i$ since the repetition period $t_d$ and the capacity $C_1$ have been determined.

As shown by the graph of Fig. 7, the value of $\Delta E$ is constant so long as the amplitude of the received pulses is sufficient to charge the capacitor C1 to a voltage E that is greater than $\Delta e$. In practicing the present invention the operation is on the portion of the graph where $\Delta E$ is fixed.

It will be assumed that the smallest amplitude received pulse to be used is 50 microvolts which is amplified to 20 volts by the log amplifier, and that the largest amplitude received pulse is 5,000 microvolts which is amplified to 200 volts by the log amplifier.

Since 90 per cent charge of capacitor C1 has been assumed, the maximum value of $\Delta E$ that is permissible if $\Delta E$ is to be constant (note Fig. 7) is $\Delta E = 90$ per cent of 20 volts or $\Delta E = 18$ volts.

$$t_d = R_1 C_1 \log_\epsilon \left(\frac{E}{E - \Delta E}\right)$$

$$t_d = R_1 C_1 \log_\epsilon \left(\frac{20}{20 - 18}\right)$$

$$t_d = 2.31 R_1 C_1$$

$$R_1 = \frac{t_d}{2.31 C_1}$$

$$R_1 = \frac{1000 \times 10^{-6}}{2.31 \times 650 \times 10^{-12}} = 0.667 \text{ megohms average.}$$

From the foregoing it is evident that the clipping circuit is designed to be operative for applied pulses varying in amplitude from a lower amplitude limit to an upper amplitude limit, this defining the operating range of the clipping circuit. In the example given, this range is from 20 volts to 200 volts. It is further evident that when the operation is occurring with the applied pulses having an amplitude at or near the lower amplitude limit, the time constant of the circuit comprising capacitor C1 and resistor R1 in series is less than the repetition period of the applied pulses. Specifically, in the example given, said time constant (average) is 0.667 megohm×650 micro-microfarads=428 microseconds. This is less than half the assumed pulse repetition period of 1000 microseconds.

For the circuit of Fig. 8, it is more useful to determine the value of the constant current to be passed through the device R1 (i. e., the tube 38). This value can be found as follows from the equation $$i = \frac{dV}{dt} C$$

Since $\Delta E$ is 18 volts and this 18 volt drop occurs in 1000 micro-seconds, $\frac{dV}{dt} = 18$ volts per 1000 micro-seconds or 18,000 volts per seconds $i = 18,000$ volts per second×650 micro-microfarads $= 11.7$ micro-amperes.

Therefore, the constant current impedance R1 should be adjusted to give 11.7 micro-amperes for values of E 20 to 200 volts.

In Fig. 9 there is illustrated by way of example one suitable logarithmic amplifier that may be employed as the I.-F. amplifier 27 (Figs. 1 and 4). In this example each amplifier stage comprises a pentode vacuum tube having its input circuit loaded down by crystals connected in opposition. Any suitable crystals such as silicon or germanium crystals may be used. Germanium is preferred in practice because it has substantially zero contact potential. These crystals load down the grid circuits of the amplifier tubes exponentially as the signal level increases. The amplifier is shown feeding into a base clipping detector of the type previously described.

Other suitable logarithmic or linear-logarithmic amplifiers are well known. For descriptions of such amplifiers, reference may be made to pages 583 to 596 of volume 23 of the Radiation Laboratory Series entitled Microwave Receivers.

While the logarithmic amplifier and the base clipping detector have been described as being employed in the I.-F. portion of a superheterodyne receiver, it should be understood that their use is not limited to I.-F. signals. They may also be employed in radio frequency or video frequency channels. Where the invention is applied to a video frequency channel, the base clipping device, of course, no longer functions as a detector but, instead, functions solely as a clipping device.

In the claims the term "logarithmic amplifier" includes the so-called linear-logarithmic amplifier.

What is claimed is:

1. A receiver for receiving pulses having a regular repetition period and having a short duration compared with their repetition period, said receiver comprising an amplitude compressing amplifier and a base clipping device connected to receive pulses from said amplifier, the pulses applied to said clipping device varying in amplitude from a lower amplitude limit to an upper amplitude limit over the operating range of said clipping device, said clipping device comprising a rectifier, a capacitor, an output resistor and an input impedance unit all connected in series with each other, and a substantially constant current resistive device connected across said capacitor, said capacitor having such capacity that it is charged close to full charge upon the reception of a single pulse, said constant current resistive device having an average resistance when the lower amplitude limit pulses are being applied to said clipping device such that the time constant of the circuit comprising said capacitor and said constant current device in series is less than the repetition period of said pulses, whereby constant amplitude pulses appear across said output resistor, and whereby the front edges of said output pulses have a timing that is substantially constant regardless of variations in the amplitude of the received pulses.

2. In a Shoran receiver comprising an indicator and a timing circuit for measuring the time of arrival of electrical pulses having a regular repetition period and which have a short duration as compared with their repetition period, said receiver further comprising an amplifier and a base clipping device through which said pulses are applied to said indicator, said amplifier being of a type that compresses the amplitude of the pulses applied thereto, the output pulses of said amplifier being applied through said base clipping device to said indicator, said base clipping device comprising means for passing only the peak of each individual output pulse from said amplifier as measured down a predetermined voltage from the peak of said individual pulse whereby pulses of constant amplitude are applied to said indicator, and whereby the front edges of said constant amplitude pulses do not vary with variations in the amplitude of the pulses applied to said amplifier.

3. A base clipping device for passing only the peaks of applied electrical pulses, said pulses occurring at a regular repetition rate and being of short duration as compared with their repetition period, the pulses applied to said clipping device varying in amplitude from a lower amplitude limit to an upper amplitude limit over the operating range of said clipping device, said device comprising a rectifier, an input impedance unit, an output impedance unit and a capacitor all connected in series with each other, said rectifier being the sole rectifier connected to pass current through said output impedance unit, and a leak resistor connected in shunt to said capacitor, said leak resistor being a substantially constant current device, said capacitor having such capacity that it is charged close to full charge each time a pulse appears across said input impedance unit, and said leak resistor having such resistance when the lower amplitude limit pulses are being applied to said clipping device that the time constant of the circuit comprising said capacitor and said leak resistor in series is less than the repetition period of said pulses.

4. A base clipping device for passing only the peaks of applied electrical pulses, said pulses occurring at a regular repetition rate and being of short duration as compared with their repetition period, the pulses applied to said clipping device varying in amplitude from a lower amplitude limit to an upper amplitude limit over the operating range of said clipping device, said device comprising a rectifier, an input impedance unit, an output impedance unit and a capacitor all connected in series with each other, said rectifier being the sole rectifier connected to pass current through said output impedance unit, and a leak resistor comprising a constant current device connected in shunt to said capacitor, said capacitor having such capacity that during the occurrence of each pulse across said input impedance unit said capacitor is brought close to full charge, said leak resistor having such average resistance that when the lower amplitude limit pulses are being applied to said clipping device the time constant of the circuit comprising said capacitor and said leak resistor in series is less than the repetition period of said pulses.

5. Base clipping apparatus wherein pulses are received which recur at a regular repetition race and which are of short duration as compared with their repetition period and wherein said pulses as applied to said apparatus vary in amplitude between a lower amplitude limit and an upper amplitude limit over the operating range of said apparatus, said apparatus comprising means for passing only the peaks of said pulses as measured down a predetermined voltage from the peaks of said pulses, said means comprising a rectifier, an input impedance unit to which said pulses are applied, an output impedance unit and a capacitor all connected in series with each other, and a leak resistor connected in shunt to said capacitor, said leak resistor being a substantially constant current device, said capacitor having such capacity that the time constant of its charging circuit is such that it is charged close to full charge each time a single pulse appears across said input impedance unit, the time constant of the circuit comprising said capacitor and said leak resistor in series being less than the repetition period of said pulses for the condition when said lower limit amplitude pulses are being applied to said apparatus, said last time constant being sufficiently less than said repetition period so that for said condition said capacitor discharges close to complete discharge between successive pulses.

References Cited in the file of this patent
UNITED STATES PATENTS

| | | |
|---|---|---|
| 2,014,509 | Roosenstein | Sept. 17, 1935 |
| 2,259,520 | Freeman | Oct. 21, 1941 |
| 2,298,083 | Fyler | Oct. 6, 1942 |
| 2,428,011 | Chatterjea et al. | Sept. 30, 1947 |
| 2,548,913 | Schreiner et al. | Apr. 17, 1951 |
| 2,586,091 | Rinia | Feb. 19, 1952 |